March 15, 1932.  K. C. D. HICKMAN  1,849,232
PHOTOGRAPHIC FILM WITH SOUND TRACK INDICATION
Filed May 27, 1929
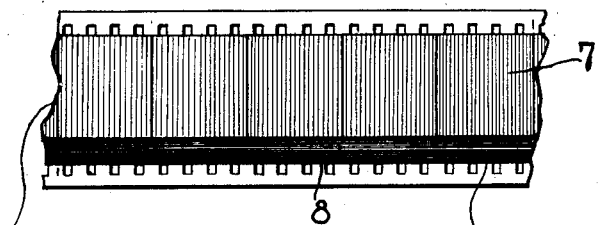
Tint invisible in dark room light.
Tint on sound record area visible under dark room light.
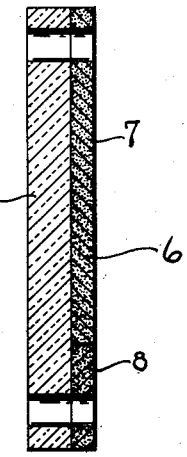
Inventor
Kenneth C. D. Hickman
By N. M. Perrins
Attorney Patented Mar. 15, 1932

1,849,232

UNITED STATES PATENT OFFICE

KENNETH C. D. HICKMAN, OF ROCHESTER, NEW YORK, ASSIGNOR TO EASTMAN KODAK COMPANY, OF ROCHESTER, NEW YORK, A CORPORATION OF NEW YORK

PHOTOGRAPHIC FILM WITH SOUND TRACK INDICATION

Application filed May 27, 1929. Serial No. 366,383.

This invention relates to photographic film and more particularly to a sound track indication on film for the reproduction of pictures and sound.

It is frequently desirable to have some indication as to the portion of the film which is reserved for the sound track or record, especially where the picture areas of the film are tinted while the sound track or record is untinted since many tints are invisible in the printing room light and confusion may thereby arise as to the location of the sound track area. In accordance with the present invention it is proposed to mark a portion of the sound track or record with a color which is visible in the darkroom light but which is either removable in the printing process or else is transparent to the actinic rays used to actuate a photoelectric cell or other light sensitive device. Another feature of the invention includes marking the entire area of the sound track area of the film with a color visible in the darkroom light.

In the drawings Fig. 1 represents a piece of photographic film while Fig. 2 represents a cross section of this piece of film.

The film of the present invention comprises a support 5 which may be of cellulosic or any other suitable material having one of its surfaces coated with a sensitized emulsion 6. This emulsion provides picture exposure areas 7 and a sound track or record area 8. It has been proposed to tint an area of the exposed surface of support 5 co-extensive with the picture exposure area 7, with tints which present pleasing color effects when the pictures are projected and since many tints, if applied to the sound record area 8 of the film, interfere with the satisfactory reproduction of said record, it has also been proposed to leave this portion of the film untinted. However, certain of said tints are invisible in the light used in the darkroom so that it is impossible to distinguish the untinted sound record area from the tinted exposure areas. I, therefore, tint the sound record area 8 with a tint which is visible under the light of the darkroom but which is transparent to, that is transmits the actinic rays to which the photoelectric cell or other light sensitive device of the sound reproducing mechanism is responsive. A tint suitable for this purpose may be made from alphazurine or toluidine blue. A tint of either of these materials in solution may be applied to the support side of the film so that it penetrates the film to such a depth that it is substantially permanent or may be applied so that it is removable in the course of the devoloping of the film.

The dyes mentioned are well-known and their physical and chemical properties and structures can be found in the usual encyclopædias or catalogs of dyes.

While I prefer to have this marking tint co-extensive with the sound record area of the film and thereby define its margins, it will be understood that the invention includes any distinctive layer or mark of any desired character or width which is superimposed above the sound record area of the film.

What I claim is:

1. A sensitized photographic film for the combined reproduction of pictures and sound having a series of picture exposure areas and a sound record area arranged in parallel relation, and an indication superimposed above the sound record area, said indication being visible under light of a color to which the film is least sensitive to indicate the position of said area but being substantially transparent to the rays for actuating a sound reproducing mechanism with which it is intended for use.

2. In a photographic film, a support, sensitized picture areas and a sensitized sound area in parallel relation on said support and a layer of tint superimposed over said sound record area, said layer being visible under light of a color to which the film is least sensitive, and said layer after development being substantially transparent to the rays for actuating a sound reproducing mechanism with which it is intended for use.

3. In a photographic film, a support, sensitized picture areas and a sensitized sound record area in parallel relation on said support, a portion of said support co-extensive with said picture area being tinted with a tint difficult of detection by light of a color to which the film is least sensitive, and a layer of tint superimposed over said sound record area, said layer being readily visible under such light, and after development being substantially transparent to the rays for actuating a sound reproducing mechanism with which it is intended for use.

4. In a photographic film, a support, sensitized picture areas and a sound record area in parallel relation on said support, a portion of said support co-extensive with said picture areas being tinted with a tint invisible under light of a color to which the film is least sensitive, and a layer of tint on the free side of said support co-extensive with and superimposed above said sound record area, said layer being visible under light of a color to which the film is least sensitive but being substantially non-absorptive of radiations therethrough to which a light sensitive cell, with which the film is intended for use in the reproduction of sound, is responsive.

5. In a photographic film, a support, sensitized picture areas and a sound record area in parallel relation on said support, a portion of said support co-extensive with said picture areas being tinted with a tint invisible under light of a color to which the film is least sensitive, and a layer of tint for marking said sound record area, said layer being visible under light of a color to which the film is least sensitive and removable during the developing of the film.

Signed at Rochester, New York, this 23rd day of May 1929.

KENNETH C. D. HICKMAN.